United States Patent
Schmalz et al.

(10) Patent No.: US 10,622,169 B2
(45) Date of Patent: Apr. 14, 2020

(54) CIRCUIT INTERRUPTER AND RECEPTACLE WITH TEMPERATURE BASED TRIP

(71) Applicant: EATON CORPORATION, Cleveland, OH (US)

(72) Inventors: Steven Christopher Schmalz, Franklin, WI (US); Xin Zhou, Wexford, PA (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 308 days.

(21) Appl. No.: 15/716,846

(22) Filed: Sep. 27, 2017

(65) Prior Publication Data

US 2019/0096598 A1 Mar. 28, 2019

(51) Int. Cl.
| | |
|---|---|
| H01H 9/54 | (2006.01) |
| H01H 71/40 | (2006.01) |
| H01H 71/24 | (2006.01) |
| H02M 7/06 | (2006.01) |
| H01H 71/14 | (2006.01) |
| H02H 3/08 | (2006.01) |
| H01H 71/12 | (2006.01) |
| H01H 73/20 | (2006.01) |
| H02H 5/04 | (2006.01) |
| G01K 7/01 | (2006.01) |

(52) U.S. Cl.
CPC ............ *H01H 9/54* (2013.01); *H01H 71/125* (2013.01); *H01H 71/14* (2013.01); *H01H 71/24* (2013.01); *H01H 71/402* (2013.01); *H02H 3/085* (2013.01); *H02M 7/06* (2013.01); *G01K 7/01* (2013.01); *H01H 73/20* (2013.01); *H02H 5/047* (2013.01)

(58) Field of Classification Search
USPC ........................................ 361/42–50
See application file for complete search history.

(56) References Cited

U.S. PATENT DOCUMENTS

| | | |
|---|---|---|
| 4,571,659 A | 2/1986 | Demeyer et al. |
| 4,695,961 A | 9/1987 | Arinobu |
| 5,115,371 A | 5/1992 | Tripodi |
| 9,520,254 B2 | 12/2016 | Zheng et al. |
| 9,520,710 B2 | 12/2016 | Zhou et al. |
| 9,728,348 B2 | 8/2017 | Zhou et al. |
| 2003/0202305 A1* | 10/2003 | Engel ............... H02H 3/085 361/93.8 |

(Continued)

*Primary Examiner* — Danny Nguyen
(74) *Attorney, Agent, or Firm* — Eckert Seamans Cherin & Mellott, LLC

(57) ABSTRACT

A circuit interrupter includes separable contacts, a trip actuator structured to cause the separable contacts to trip open, a conductor structured to carry power through the circuit interrupter, a sensor having a forward bias voltage drop inversely proportional to temperature and being disposed proximate the conductor, an amplifier circuit electrically connected to the sensor and being structured to amplify the forward bias voltage drop of the sensor, and a comparator circuit structured to compare the amplified forward bias voltage drop with a predetermined reference voltage and to output a signal to the trip actuator when the amplified forward bias voltage drop is less than or equal to the predetermined reference voltage. The signal causes the trip actuator to cause the separable contacts to trip open.

16 Claims, 8 Drawing Sheets

(56) References Cited

U.S. PATENT DOCUMENTS

2004/0008460 A1* 1/2004 Engel .................. H02H 1/0015
361/42
2016/0276115 A1 9/2016 Zheng et al.

* cited by examiner

CIRCUIT INTERRUPTER AND RECEPTACLE WITH TEMPERATURE BASED TRIP

BACKGROUND

Field

The disclosed concept relates generally to circuit interrupters, and in particular, to circuit interrupters including a temperature based tripping.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Some circuit interrupters sense faults and/or trip based on temperature of circuit breakers in the circuit interrupter. One method of implementing a temperature based trip is to include a bimetallic strip within the circuit interrupter. The bimetallic strip is arranged to conduct current flowing through the circuit interrupter. The bimetallic strip is structured to bend as the current flowing through it increases. Once the bimetallic strip bends sufficiently, it causes the circuit interrupter to trip by releasing a latch or activating another mechanism. It is difficult to precisely set the temperature level at which the circuit interrupter will trip using a bimetallic strip. Due in part to manufacturing limitations, it is difficult precisely calibrate a circuit interrupter to precisely and repeatedly trip at a specific temperature. It is also tedious and time consuming to calibrate each individual circuit interrupter. Furthermore, the bimetallic strip introduces a resistive element into the circuit interrupter, which reduces its efficiency in conducting power.

Another method of implementing a temperature based trip is to include an electronic trip unit to sense any faults occurring with the circuit interrupter based on inputs received from various sensors. A temperature sensor may be employed with an electronic trip unit to sense temperature based faults. However, the introduction of an electronic trip unit substantially increases the cost of the circuit interrupter as well as increases its power consumption.

There is also room for improvement in circuit interrupters.

SUMMARY

These needs and others are met by embodiments of the disclosed concept in which a circuit interrupter provides temperature based tripping.

In accordance with one aspect of the disclosed concept, a circuit interrupter comprises: separable contacts; a trip actuator structured to cause the separable contacts to trip open; a conductor structured to carry power through the circuit interrupter; a sensor having a forward bias voltage drop inversely proportional to temperature and being disposed proximate the conductor; an amplifier circuit electrically connected to the sensor and being structured to amplify the forward bias voltage drop of the sensor; and a comparator circuit structured to compare the amplified forward bias voltage drop with a predetermined reference voltage and to output a signal to the trip actuator when the amplified forward bias voltage drop is less than or equal to the predetermined reference voltage, wherein the signal causes the trip actuator to cause the separable contacts to trip open.

In accordance with another aspect of the disclosed concept, a receptacle comprises: separable contacts; a trip actuator structured to cause the separable contacts to trip open; an outlet structured to electrically connect to a load; a conductor structured to carry power through the receptacle; a sensor having a forward bias voltage drop inversely proportional to temperature and being disposed proximate the conductor; an amplifier circuit electrically connected to the sensor and being structured to amplify the forward bias voltage drop of the sensor; and a comparator circuit structured to compare the amplified forward bias voltage drop with a predetermined reference voltage and to output a signal to the trip actuator when the amplified forward bias voltage drop is less than or equal to the predetermined reference voltage, wherein the signal causes the trip actuator to cause the separable contacts to trip open and prevent power from flowing to the load via the outlet.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
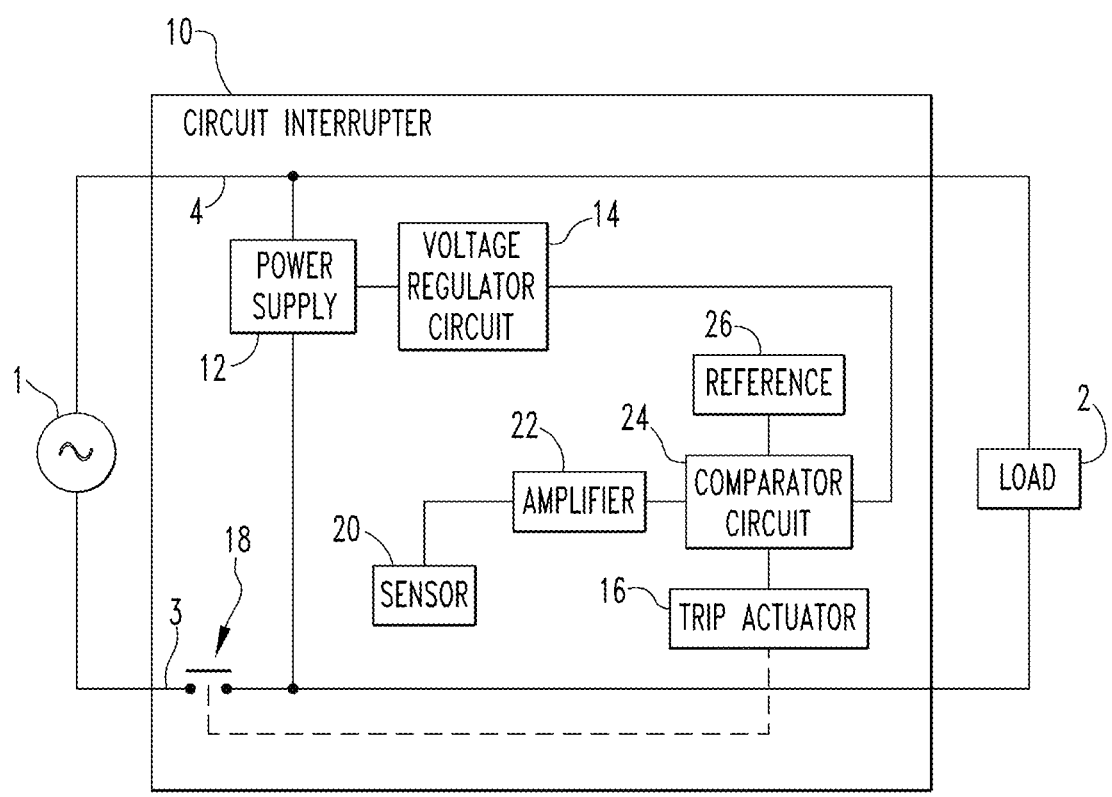
FIG. 1 is a schematic diagram of a circuit interrupter including a temperature sensing circuit in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIG. 1 is a schematic diagram of a circuit interrupter 10 in accordance with an example embodiment of the disclosed concept. The circuit interrupter 10 is structured to be electrically connected on a protected circuit between a power source 1 and a load 2. Power from the power source may be conducted through the circuit interrupter 10 via line and neutral conductors 3,4 included in the circuit interrupter 10.

The circuit interrupter 10 includes a trip actuator 16 and separable contacts 18. The trip actuator 16 is structured to cause the separable contacts 18 to trip open. Tripping open the separable contacts 18 stops current from flowing between the power source 1 and the load 2. To cause the separable contacts 18 to trip open, the trip actuator 16 may cooperate with an operating mechanism (not shown). In some example embodiments of the disclosed concept, the trip actuator 16 may include a solenoid. In some example embodiments of the disclosed concept, the operating mechanism may be a mechanism structured to separate the separable contacts 18 in response to actuation of the trip actuator 16.

The circuit interrupter 10 further includes sensor 20 and an amplifier 22. The sensor 20 is disposed proximate to and thermally coupled to the line conductor 3 in some example embodiments of the disclosed concept. It will also be appreciated that the sensor 20 may alternatively be disposed proximate the neutral conductor 4 without departing from the scope of the disclosed concept. The sensor 20 is structured to sense temperature. In some example embodiments of the disclosed concept, the sensor 20 may be a temperature sensing diode having a forward bias voltage drop inversely proportional to the temperature of the sensor 20. An output of the sensor 20 is electrically connected to the amplifier 22. The amplifier 22 is structured to amplify the output of the sensor 20. In some example embodiments of the disclosed concept, the output of the sensor 20 is the forward bias voltage drop of the sensor 20. In some example embodiments of the disclosed concept, the amplifier 22 is a differential amplifier.

The circuit interrupter 10 further includes a comparator circuit 24 and a reference voltage 26. The comparator circuit 24 is electrically connected to an output of the amplifier 22. The comparator circuit 24 is structured to compare the output of the amplifier 22 (e.g., without limitation, the amplified forward bias voltage drop of the sensor 20) to the reference voltage 26. The comparator circuit 24 is structured to output a signal to the trip actuator 16 to cause the trip actuator 16 to cause the separable contacts 18 to trip open if the output of the amplifier 22 is less than the reference voltage 26. If the output of the amplifier 22 is greater than the reference voltage 26, the comparator circuit 24 does not output the signal to the trip actuator 16.

The circuit interrupter 10 also includes a power supply 12 and a voltage regulator circuit 14. The power supply 12 is structured to convert power from the power source 1 for use by components of the circuit interrupter 10. For example, the power supply 12 may convert AC power from the power source into DC power for use by the circuit interrupter 10. The voltage regulator circuit 14 is electrically connected between the power supply and the comparator circuit 24. The voltage regulator circuit 14 is structured to output an enable signal to the comparator circuit 24 once the power supply 12 has reached a stable supply voltage. For example, when the power supply 12 initially receives AC power from the power source 1, it takes a short amount of time (e.g., without limitation, 100 ms or less) to convert the AC power into DC power having a stable DC voltage. An unstable DC voltage could affect operation of the circuit interrupter 10 and possibly cause the comparator circuit 24 to prematurely output a signal to the trip actuator 16. However, in some example embodiments of the disclosed concept, the comparator circuit 24 is structured so that it is not able to output the signal to the trip actuator until it receives the enable signal from the voltage regulator circuit 14.

Figure 2:
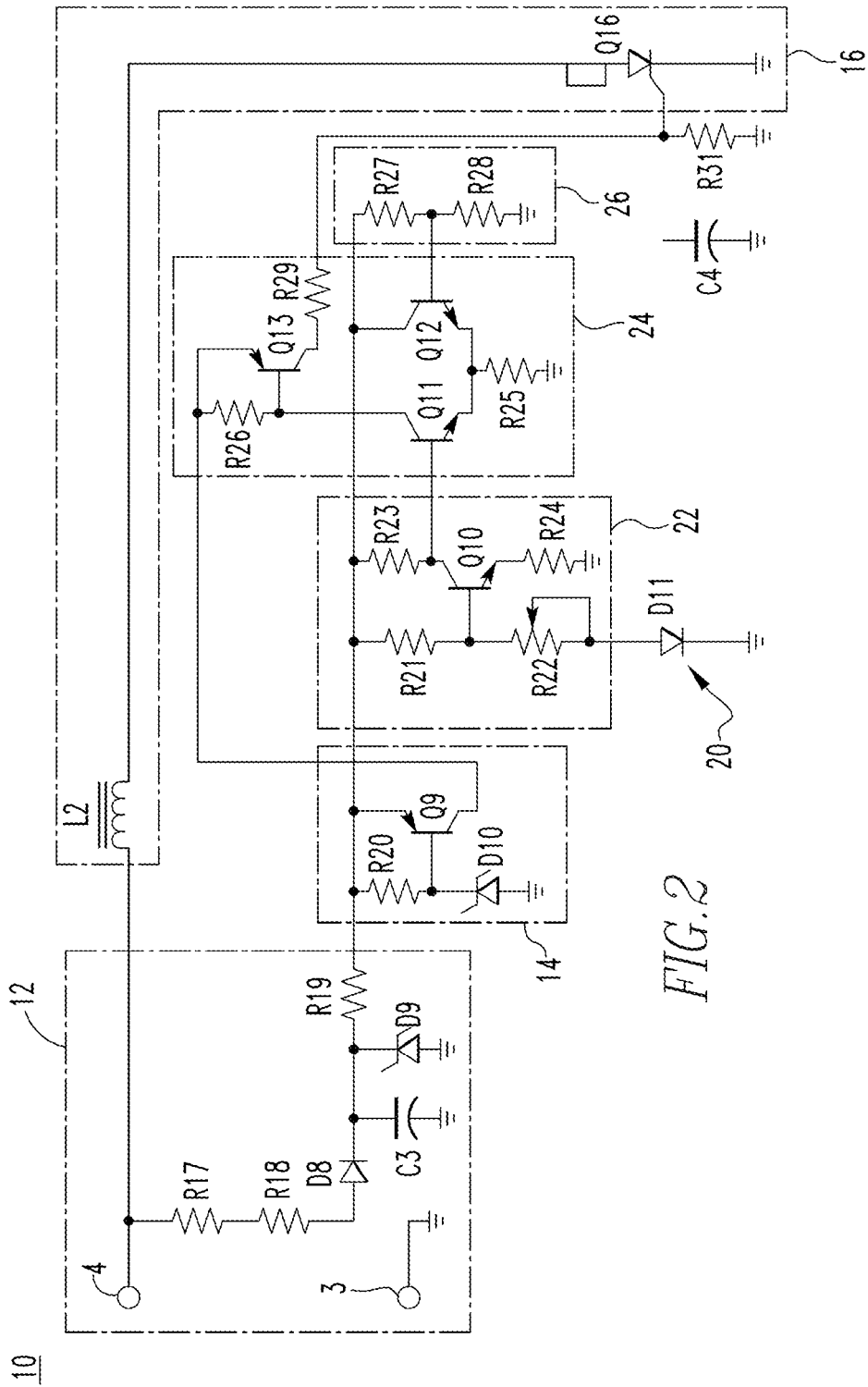
FIG. 2 is a circuit diagram of the circuit interrupter of FIG. 1 in accordance with an example embodiment of the disclosed concept.

FIG. 2 is a circuit diagram of the circuit interrupter 10 of FIG. 1 in accordance with an example embodiment of the disclosed concept. The circuit diagram of FIG. 2 illustrates one example embodiment of an arrangement of circuit components of the circuit interrupter 10. However, it will be appreciated that different components and arrangement of components may be employed without departing from the scope of the disclosed concept.

In the example embodiment shown in FIG. 2, the amplifier 22 includes first, second, and third resistors R21,R23, R24, a potentiometer R22, and a transistor Q10. In some example embodiments of the disclosed concept, the transistor Q10 may be a bipolar junction transistor having a base, a collector, and an emitter. The first resistor R21 is electrically connected between the base of the transistor Q10 and a supply voltage. The supply voltage is provided by the power supply 12. The second resistor R23 is electrically connected between the supply voltage and a collector of the transistor Q10. The third resistor R24 is electrically connected between an emitter of the transistor Q10 and ground. The collector of the transistor Q10 is electrically connected to the comparator circuit 24.

In the example embodiment shown in FIG. 2, the comparator circuit 24 includes first, second, and third resistors R25,R26,R29 and first, second, and third transistors Q11, Q12,Q13. The first, second, and third transistors Q11,Q12, Q13 may be bipolar junction transistors each having a base, a collector, and an emitter. The first resistor R25 is electrically connected between emitters of the first and second transistors Q11,Q12 and ground. The second resistor R26 is electrically connected to a base of the third transistor Q13 and a collector of the first transistor Q11. The third resistor R29 is electrically connected to an emitter of the third transistor Q11. The base of the first transistor Q11 is structured to receive the output of the amplifier 22 and a base of the second transistor Q12 is structured to receive the reference voltage. The comparator circuit 24 is structured to output a signal to the trip actuator 16 through the third resistor R29.

Also, in the example embodiment shown in FIG. 2, the voltage regulator circuit 14 includes a resistor R20, a zener diode D10, and a transistor Q9. The transistor Q9 may be a bipolar junction transistor having a base, a collector, and an emitter. The resistor R20 is electrically connected between the supply voltage and the base of the transistor Q9. The zener diode D10 is electrically connected between ground and the base of the transistor Q9. The emitter of the transistor Q9 is electrically connected to the supply voltage. The collector of the transistor Q9 is electrically connected to the comparator circuit 24 and is structured to output the enable signal to the comparator circuit 24.

In the example embodiment shown in FIG. 2, the sensor 20 is a diode D11. In some example embodiments of the disclosed concept, the diode D11 may be a diode having a P-N junction and the forward bias voltage drop of the diode D11 is the voltage drop across the P-N junction. In some example embodiments of the disclosed concept, the sensor 20 may be a bipolar junction transistor having a P-N junction and the forward bias voltage drop of the sensor 20 is the voltage drop across the P-N junction. It will also be appreciated that in some example embodiments of the disclosed concept, the forward bias voltage drop of the sensor 20 is inversely proportional to temperature at a rate of about 2 mV per degree Celsius. It will also be appreciated by those having ordinary skill in the art at which the forward bias voltage drop of the sensor 20 is proportional to temperature may differ without departing from the scope of the disclosed concept.

While FIG. 2 illustrates a single diode D11 provided as the sensor 20, it will be appreciated by those having ordinary skill in the art that the sensor 20 may include multiple components. For example and without limitation, the sensor 20 may be comprised of multiple diodes and/or transistors electrically connected in parallel with each other without departing from the scope of the disclosed concept.

In the example embodiment shown in FIG. 2, the trip actuator 16 includes a silicon controlled rectifier (SCR) Q16 and a solenoid L2. The SCR Q16 includes a gate, an anode, and a cathode. The SCR Q16 and the solenoid L2 are electrically connected in series between the neutral conductor 4 and ground. It will be appreciated by those having ordinary skill in the art that ground, in the context of the circuit diagram of FIG. 2, may be a connection to the line conductor 3 on a load side (e.g., between the separable contacts 18 and the load 2) of the line conductor 3. Applying a signal to the gate of the SCR Q16 allows current from the neutral conductor 4 to flow through the SCR Q16 and solenoid L2 to ground, which cause the solenoid L2 to actuate. Actuation of the solenoid L2 causes the separable contacts 18 (shown in FIG. 1) to trip open by, for example, causing an operating mechanism to activate and separate the separable contacts 18. The trip actuator 16 is structured to receive the output of the comparator circuit 24 at the gate of the SCR Q16.

The reference voltage 26 is provided by a first resistor R27 and a second resistor R28 arranged as a voltage divider between the supply voltage and ground. The reference voltage 26 may be selected such that the comparator circuit 24 outputs a signal to the trip actuator 16 when the sensor 20 reaches a predetermined temperature.

The power supply includes first, second, and third resistors R17,R18,R19, a diode D8, a capacitor C3, and a zener diode D9. The first and second resistors R17,R18 are electrically connected in series between the neutral conductor 4 and an anode of the diode D8. The capacitor C3 and the zener diode D9 are electrically connected in parallel between a cathode of the diode D8 and ground. The third resistor R19 is electrically connected between the cathode of the diode D8 and an output of the power supply 12. The supply voltage is provided at the output of the power supply 12.

It will be appreciated by those having ordinary skill in the art that the arrangement of circuit components shown in FIG. 2 is just one example of an arrangement of components that may be employed in the circuit interrupter 10. For example, FIG. 3 is a circuit diagram of the circuit interrupter 10 employing a different arrangement of circuit components.

Figure 3:
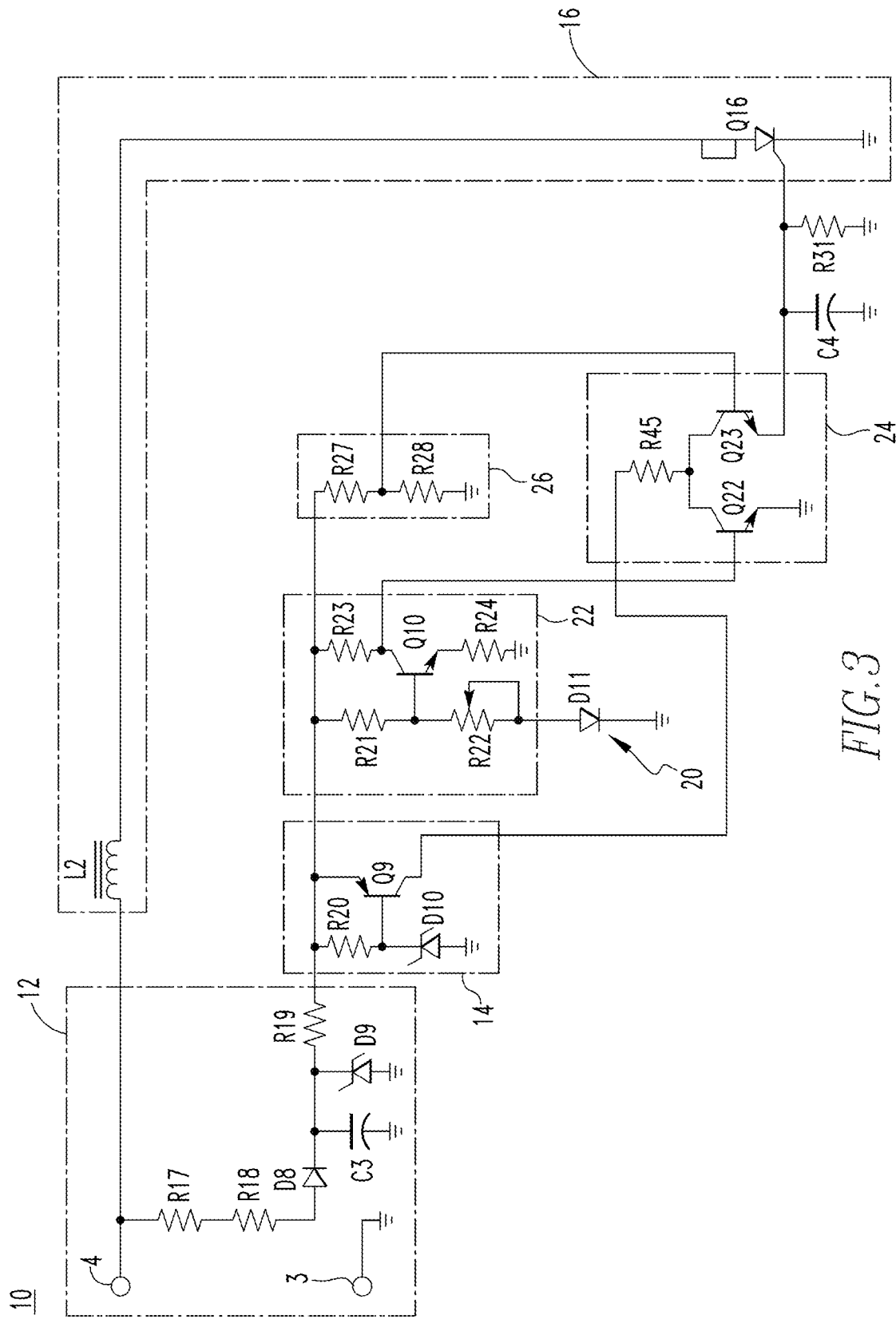
FIG. 3 is a circuit diagram of the circuit interrupter of FIG. 1 in accordance with another example embodiment of the disclosed concept.

In the example embodiment of FIG. 3, the power supply 12, the voltage regulator circuit 14, the trip actuator 16, the sensor 20, the amplifier 22, and the reference voltage 26 include the same components and arrangement as described above with respect to FIG. 2. For economy of disclosure, the repeated description of these arrangements of components has been omitted.

In the example embodiment of FIG. 3, the comparator circuit 24 includes an alternative arrangement of circuit components. The comparator circuit 24 of FIG. 3 includes a resistor R45 and first and second transistors Q22,Q23. The first and second transistors Q22,Q23 may each be bipolar junction transistors each including a base, a collector, and an emitter. The resistor is electrically connected between the output of the voltage regulator 14 and the emitters of the first and second transistors Q22,Q23. The base of the first transistor Q22 is electrically connected to the output of the amplifier 22 and the base of the second transistor Q23 is electrically connected to the reference voltage 26. The collector of the second transistor Q23 is electrically connected to the gate of the SCR Q16 of the trip actuator 16 and the output signal of the comparator circuit 24 is output via the collector of the second transistor Q23.

Circuit breakers and receptacles are different types of circuit interrupters that the disclosed concept may be embodied in. However, it will be appreciated by those having ordinary skill in the art that the disclosed concept may be embodied in different suitable applications as well.

Figure 4:
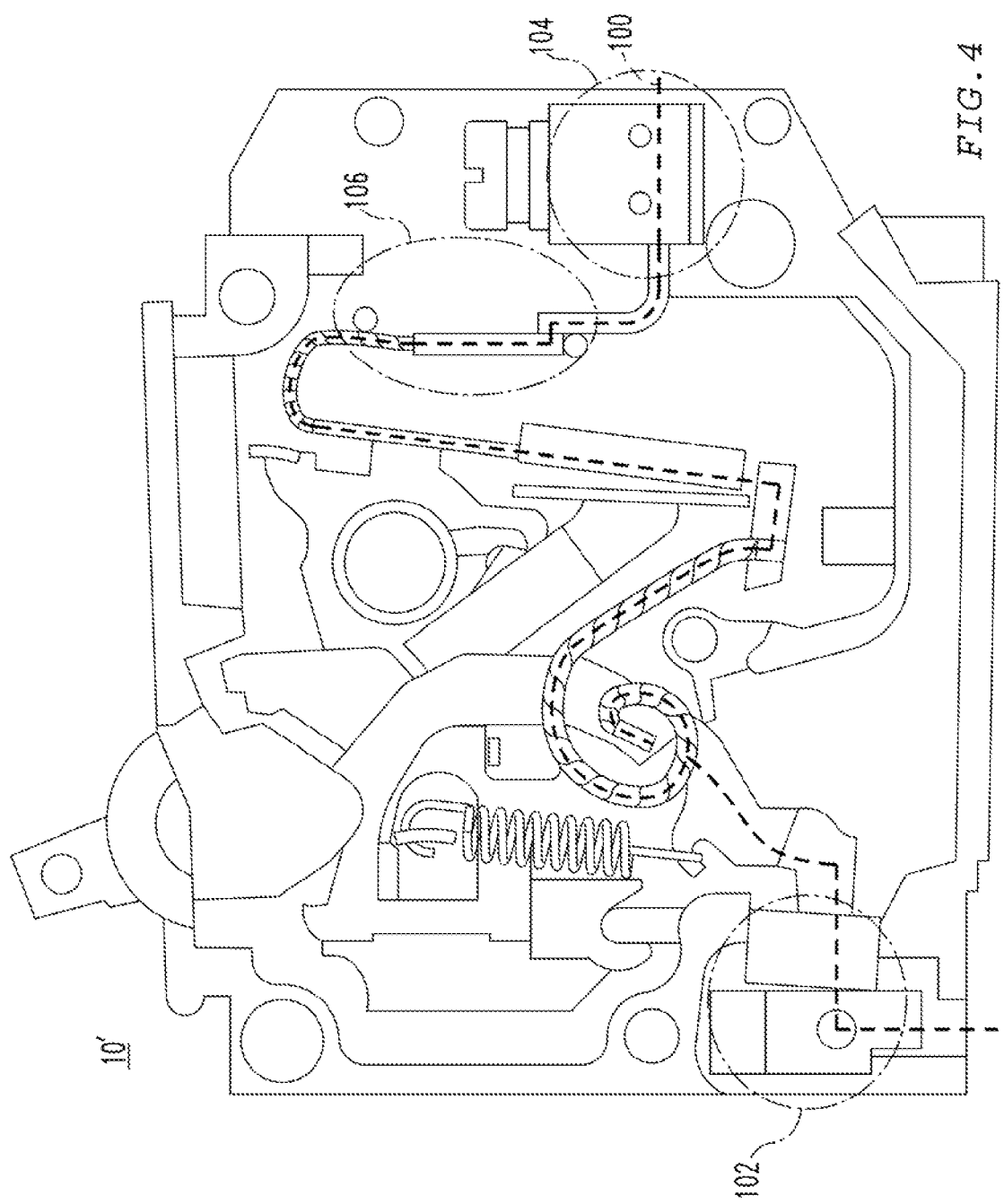
FIG. 4 is a diagram of a circuit interrupter employed as a circuit breaker in accordance with an example embodiment of the disclosed concept.

FIG. 4 is a diagram of the circuit interrupter 10 embodied as a circuit breaker 10' in accordance with an example embodiment of the disclosed concept. It will be appreciated by those having ordinary skill in the art that circuit interrupters 10 in accordance with the disclosed concept may be employed in circuit breakers such as the circuit breaker 10' shown in FIG. 4. FIG. 4 illustrates a conductive path 100 (shown approximately with a dashed line) through the circuit breaker 10'. The conductive path 100 represents the path through which line current travels through the circuit breaker 10'.

When the disclosed concept is embodied in the circuit breaker 10', components such as the power supply 12, the voltage regulator circuit 14, the trip actuator 16, the amplifier 22, the comparator circuit 24, and the reference voltage 26 (shown in FIG. 1) may be disposed at any suitable location within the circuit breaker 10'. In some example embodiments of the disclosed concept, the sensor 20 is disposed proximate to the conductive path 100 of the circuit breaker 10'. The sensor 20 may be disposed in direct contact with a point on the conductive path 100 or thermally coupled to and within a short distance of a point on the conductive path 100 such that current flowing through the conductive path 100 is a primary cause of temperature change of the sensor 20.

An input terminal 102, and output terminal 104, and a resistive shunt 106 are illustrated along the conductive path 100 of the circuit breaker 10'. In some example embodiments of the disclosed concept, the sensor 20 is disposed proximate one of the input terminal 102, the output terminal 104, and the resistive shunt 106. However, it will be appreciated by those having ordinary skill in the art that the sensor 20 may be disposed proximate other locations along the conductive path 100 without departing from the scope of the disclosed concept.

In some example embodiments of the disclosed concept, a bimetallic strip may be omitted from the circuit breaker 10'. Omitting the bimetallic strip and providing temperature based tripping with the sensor 20 instead, the efficiency of the circuit breaker 10' in conductor power is improved.

Figure 5:
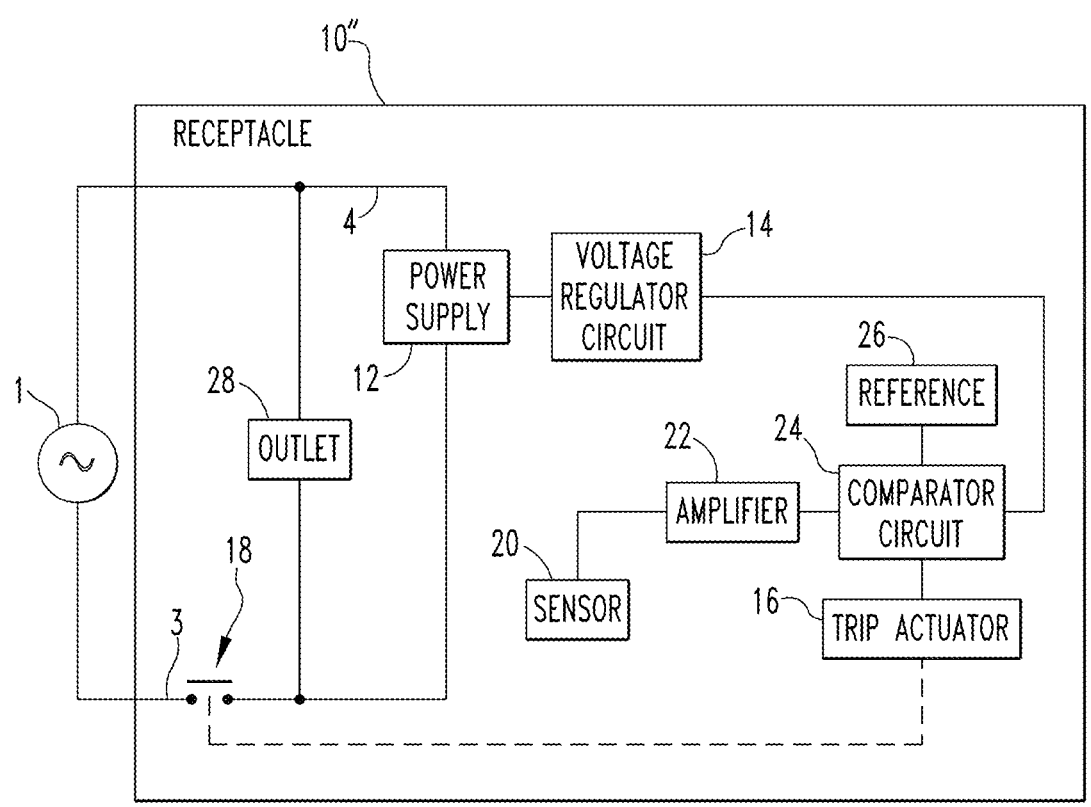
FIG. 5 is a schematic diagram of a receptacle in accordance with an example embodiment of the disclosed concept.

FIG. 5 is a schematic diagram of a receptacle 10" in accordance with an example embodiment of the disclosed concept. Circuit interrupters in accordance with the disclosed concept may be employed as receptacles such as the receptacle 10" shown in FIG. 5. The receptacle 10" includes the power supply 12, voltage regulator circuit 14, trip actuator 16, sensor 20, amplifier 22, comparator circuit 24, and reference voltage 26 similar to the circuit interrupter 10 of FIG. 1. For economy of disclosure, repeated description of these components is omitted.

The receptacle 10" of FIG. 5 further includes an outlet 28. The outlet 28 may include terminals and/or plug stabs suitable for receiving a plug. The outlet 28 may be electrically connected to a load via the plug. It will be appreciated by those having ordinary skill in the art that the receptacle 10" may include more than one outlet 28. The outlet 28 is electrically connected between the line and neutral conductors 3,4. Opening the separable contacts 18 causes power to stop flowing from the power source 1 to the outlet 28.

Figure 6B:
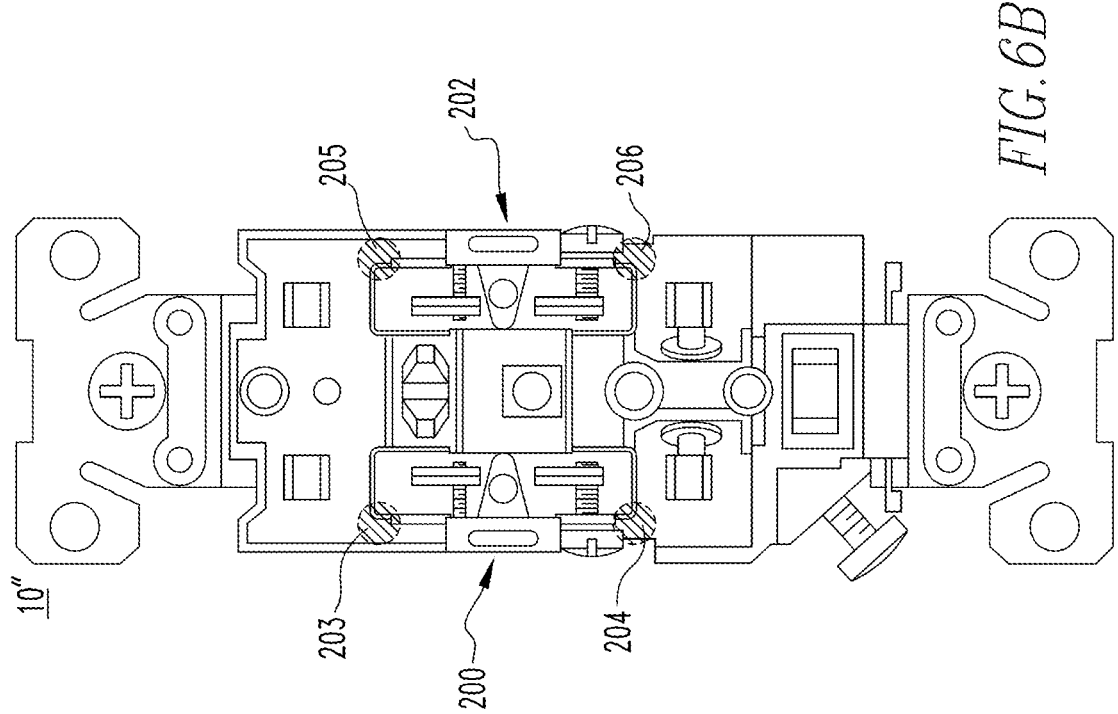
FIGS. 6A and 6B are front and rear views of a receptacle in accordance with an example embodiment of the disclosed concept.
Figure 6A:
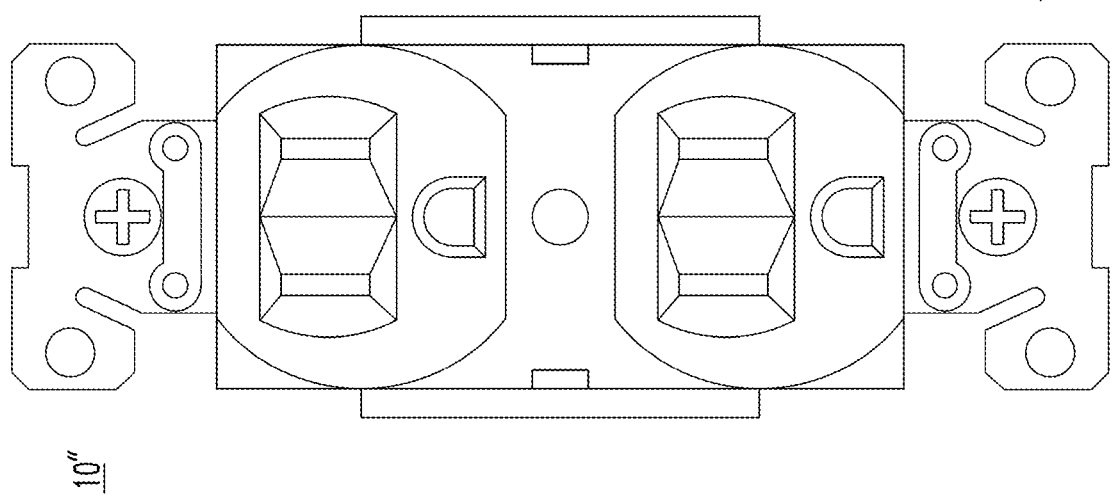

FIG. 6A is a front view of a receptacle 10" in accordance with an example embodiment of the disclosed concept and FIG. 6B is a rear view of the receptacle 10" of FIG. 6A. It will be appreciated by those having ordinary skill in the art that the disclosed concept may be embodied in receptacles such as the receptacle 10" shown in FIGS. 6A and 6B. FIG. 6B illustrates a neutral bus 200 and a line bus 202 of the receptacle 10". The neutral bus 200 and the line bus 202 are connected to a power source and power is provided to the plug slots of the receptacle 10" via the neutral and line busses 200,202.

When the disclosed concept is embodied in the receptacle 10", components such as the power supply 12, the voltage regulator circuit 14, the trip actuator 16, the amplifier 22, the comparator circuit 24, and the reference voltage 26 (shown in FIG. 1) may be disposed at any suitable location within the receptacle 10". In some example embodiments of the disclosed concept, the sensor 20 is disposed proximate to any point where current flows through the receptacle 10". The sensor 20 may be disposed in direct contact with a point on the conductor carrying current or thermally coupled to and within a short distance of a conductor carrying current such that current flowing through the conductor is a primary cause of temperature change of the sensor 20.

In some example embodiments of the disclosed concept, the sensor 20 is disposed proximate one or more points on the neutral and/or line busses 200,202. For example and without limitation, the sensor 20 may be disposed proximate to one or more of the sensor locations 203,204,205,206 on the neutral and line busses 200,202 shown in FIG. 6B. However, it will be appreciated by those having ordinary skill in the art that the sensor 20 may be disposed at other locations within the receptacle 10" without departing from the scope of the disclosed concept.

Figure 7:
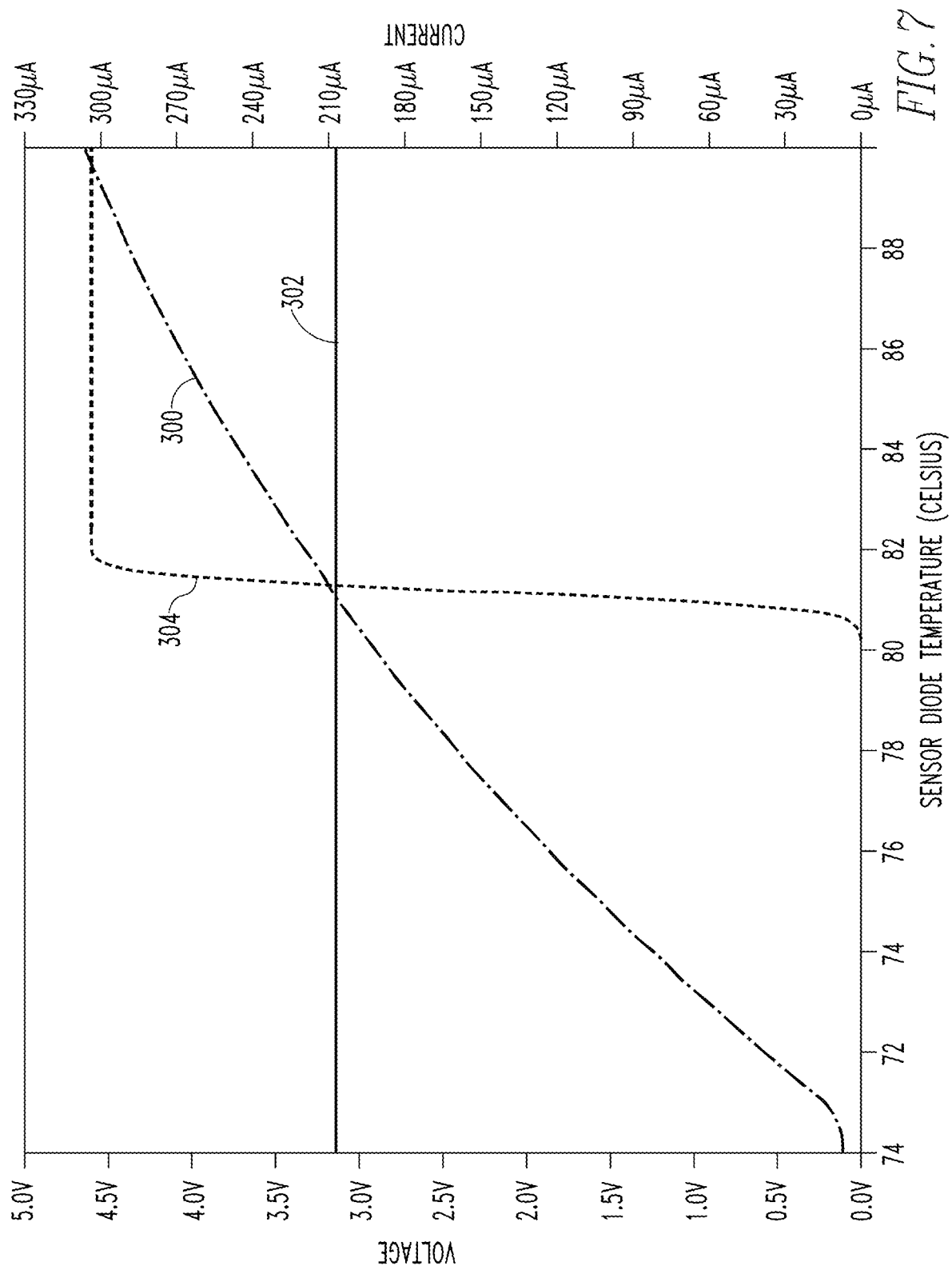
FIGS. 7 and 8 are graphs of signals with the circuit interrupter of FIG. 1 in accordance with an example embodiment of the disclosed concept.

FIG. 7 is a graph comparing different voltages and currents with temperature in the circuit interrupter 10 in accordance with an example embodiment of the disclosed concept. A first plot 300 shows the voltage of the output of the amplifier 22 compared to the temperature of the sensor 20. As shown in FIG. 7, the voltage of the output of the amplifier 22 is proportional to the temperature of the sensor 20. A second plot 302 shows the reference voltage 26. As shown in FIG. 7, the reference voltage 26 is constant. A third plot 304 shows the current at the output of the comparator circuit 24. As shown in FIG. 7, when the voltage at the output of the amplifier 22 is less than the reference voltage 26, no current is output from the comparator circuit 24. When the voltage at the output of the amplifier 22 exceeds the reference voltage 26, the comparator circuit 24 outputs a signal.

The voltages, currents, and temperatures shown in FIG. 7 are associated with one example embodiment of the disclosed concept. It will be appreciated by those having ordinary skill in the art that different components and values of components may be employed in the circuit interrupter 10 resulting in different voltages, currents, and temperatures without departing from the scope of the disclosed concept. For example and without limitation, components may be selected such that the comparator circuit 24 outputs a signal to activate the trip actuator 16 at a desired temperature of the sensor 20.

Figure 8:
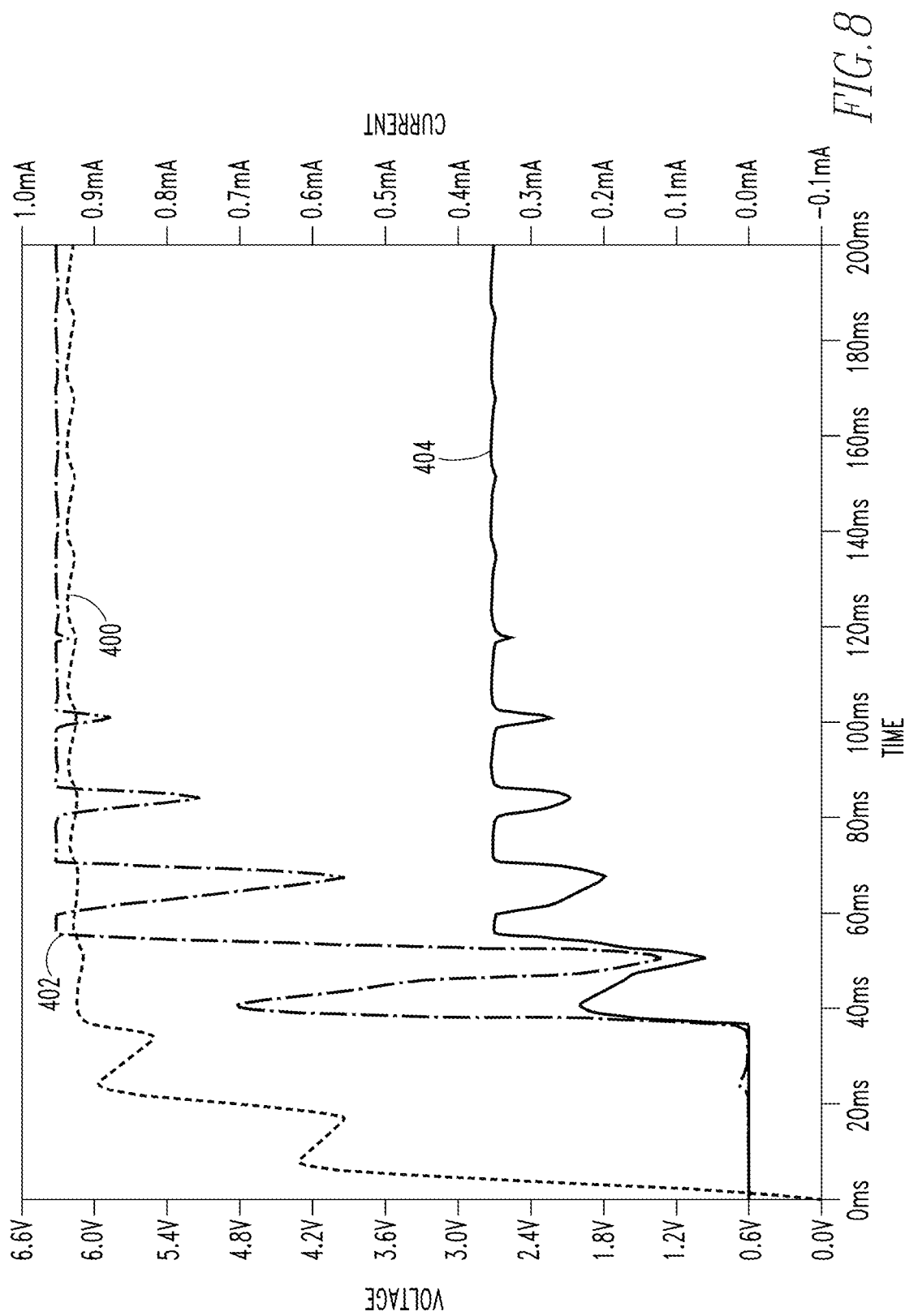

FIG. 8 is another graph comparing different voltages and currents with time in the circuit interrupter 10 in accordance with an example embodiment of the disclosed concept. The graph of FIG. 8 begins when power is applied to the circuit interrupter 10. Additionally, in the graph of FIG. 8, the sensor 20 begins at a high enough temperature to cause the circuit interrupter 10 to trip open the separable contacts 18. The graph of FIG. 8 illustrates how the signal output by the comparator circuit 24 is delayed until the voltage regulator circuit 14 outputs the enable signal.

A first plot 400 shows the supply voltage output by the power supply 12 versus time. A second plot 402 shows the current of the enable signal output by the voltage regulator circuit 14 versus time. A third plot 404 shows the current at the output of the comparator circuit 24. As shown in FIG. 8, the current of the enable signal does not increase until the voltage of the supply voltage begins to stabilize. In the example shown in FIG. 8, the current of the enable signal does not begin increasing until about 40 ms after power is applied to the circuit interrupter 10. Similarly, the comparator circuit 24 does not begin outputting a signal until the enable signal begins increases. The delay in the comparator circuit 24 outputting its signal until the supply voltage stabilizes helps to prevent the potential of unwanted trips due to errant transients during startup or interruptions in the power source.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:
   separable contacts;
   a trip actuator structured to cause the separable contacts to trip open;
   a conductor structured to carry power through the circuit interrupter;
   a sensor having a forward bias voltage drop inversely proportional to temperature and being disposed proximate and thermally coupled to the conductor;
   an amplifier circuit electrically connected to the sensor and being structured to amplify the forward bias voltage drop of the sensor;
   a comparator circuit structured to compare the amplified forward bias voltage drop with a predetermined reference voltage and to output a signal to the trip actuator when the amplified forward bias voltage drop is less than or equal to the predetermined reference voltage;
   a power supply structured to receive an alternating current voltage and to convert the alternating current voltage to a direct current voltage as a supply voltage for the circuit interrupter; and
   a voltage regulator circuit structured to output an enable signal to activate the comparator circuit when the supply voltage provided by the power supply stabilizes, wherein the signal causes the trip actuator to cause the separable contacts to trip open.

2. The circuit interrupter of claim 1, wherein the sensor is a diode having a P-N junction and the forward bias voltage drop is a voltage drop across the P-N junction.

3. The circuit interrupter of claim 1, wherein the sensor is a bi-polar junction transistor having a P-N junction and the forward bias voltage drop is a voltage drop across the P-N junction.

4. The circuit interrupter of claim 1, wherein the forward bias voltage drop of the sensor is inversely proportional to temperature at a predetermined rate of voltage drop per degree Celsius.

5. The circuit interrupter of claim 1, wherein the amplifier includes first, second, and third resistors, a potentiometer, and a transistor; wherein the potentiometer is electrically connected between a base of the transistor and the sensor; wherein the first resistor is electrically connected between the base of the transistor and a supply voltage; wherein the second resistor is electrically connected between the supply voltage and a collector of the transistor; wherein the third resistor is electrically connected between an emitter of the transistor and ground; and wherein the collector of the transistor is electrically connected to the comparator.

6. The circuit interrupter of claim 1, wherein the comparator circuit includes first, second, and third resistors and first, second, and third transistors; wherein the first resistor is electrically connected between emitters of the first and second transistors and ground; wherein the second resistor is electrically connected to a base of the third transistor and a collector of the first transistor; wherein the third resistor is electrically connected to an emitter of the third transistor; wherein the base of the first transistor is structured to receive the amplified forward bias voltage drop and a base of the second transistor is structured to receive the predetermined reference voltage; and wherein the comparator circuit is structured to output the signal through the third resistor.

7. The circuit interrupter of claim 1, wherein the comparator circuit includes a resistor and first and second transistors; wherein the resistor is electrically connected to emitters of the first and second transistors; wherein a base of the first transistor is structured to receive the amplified forward bias voltage drop; wherein a base of the second transistor is structured to receive the predetermined reference voltage; and wherein the comparator circuit is structured to output the signal through a collector of the second transistor.

8. The circuit interrupter of claim 1, wherein the voltage regulator circuit includes a resistor, a zener diode, and a transistor; wherein the resistor is electrically connected between the supply voltage and a base of the transistor; wherein the zener diode is electrically connected between ground and the base of the transistor; wherein an emitter of the transistor is electrically connected to the supply voltage; and wherein a collector of the transistor is electrically connected to the comparator and is structured to output the activation signal.

9. The circuit interrupter of claim 1, wherein the trip actuator includes a silicon controlled rectifier and a solenoid; wherein the trip actuator is structured to receive the signal at a gate of the silicon controlled rectifier; and wherein the silicon controlled rectifier is structured to activate and allow current to flow through the solenoid in response to receiving the signal.

10. The circuit interrupter of claim 1, wherein the sensor includes a plurality of diodes or transistors electrically connected in parallel.

11. The circuit interrupter of claim 1, wherein the circuit interrupter is a circuit breaker having a conductive path therethrough; and wherein the sensor is disposed proximate and thermally coupled to the conductive path.

12. The circuit interrupter of claim 11, further comprising:
an input terminal disposed on the conductive path; and
an output terminal disposed on the conductive path,
wherein the sensor is disposed proximate and thermally coupled to one of the input terminal and the output terminal.

13. A circuit interrupter comprising:
separable contacts;
a trip actuator structured to cause the separable contacts to trip open;
a conductor structured to carry power through the circuit interrupter;
a sensor having a forward bias voltage drop inversely proportional to temperature and being disposed proximate and thermally coupled to the conductor;
an amplifier circuit electrically connected to the sensor and being structured to amplify the forward bias voltage drop of the sensor;
a comparator circuit structured to compare the amplified forward bias voltage drop with a predetermined reference voltage and to output a signal to the trip actuator when the amplified forward bias voltage drop is less than or equal to the predetermined reference voltage,
wherein the signal causes the trip actuator to cause the separable contacts to trip open,
wherein the circuit interrupter is a circuit breaker having a conductive path therethrough, and wherein the sensor is disposed proximate and thermally coupled to the conductive path, and
wherein the circuit interrupter further comprises:
an input terminal disposed on the conductive path;
an output terminal disposed on the conductive path, wherein the sensor is disposed proximate and thermally coupled to one of the input terminal and the output terminal; and and
a resistive element disposed on the conductive path,
wherein the sensor is disposed proximate and thermally coupled to the resistive element.

14. The circuit interrupter of claim 12, wherein the circuit interrupter does not include a bimetallic element.

15. A receptacle comprising:
separable contacts;
a trip actuator structured to cause the separable contacts to trip open;
an outlet structured to electrically connect to a load;
a conductor structured to carry power through the receptacle;
a sensor having a forward bias voltage drop inversely proportional to temperature and being disposed proximate and thermally coupled to the conductor;
an amplifier circuit electrically connected to the sensor and being structured to amplify the forward bias voltage drop of the sensor;
a comparator circuit structured to compare the amplified forward bias voltage drop with a predetermined reference voltage and to output a signal to the trip actuator when the amplified forward bias voltage drop is less than or equal to the predetermined reference voltage;
a power supply structured to receive an alternating current voltage and to convert the alternating current voltage to a direct current voltage as a supply voltage for the circuit interrupter; and a voltage regulator circuit structured to output an enable signal to activate the comparator circuit when the supply voltage provided by the power supply stabilizes, wherein the signal causes the trip actuator to cause the separable contacts to trip open and prevent power from flowing to the load via the outlet.

16. The circuit interrupter of claim 15, further comprising:

a neutral bus; and a line bus, wherein the sensor is disposed proximate the neutral bus or the line bus.

\* \* \* \* \*